Feb. 28, 1928.

A. NEWBURGER ET AL 1,660,349

STAGE LIGHTING

Filed Feb. 24, 1925

INVENTORS
Anton Newburger
and Edward Schultz
BY C. P. Goepel
their ATTORNEY

Patented Feb. 28, 1928.

1,660,349

UNITED STATES PATENT OFFICE.

ANTON NEWBURGER, OF BROOKLYN, NEW YORK, AND EDWARD SCHULTZ, OF HARRINGTON PARK, NEW JERSEY; CLARA L. A. NEWBURGER, EXECUTRIX OF ANTON NEWBURGER, DECEASED, ASSIGNORS TO A. NEWBURGER ELECTRIC CO., OF BROOKLYN, NEW YORK, A CORPORATION OF NEW YORK.

STAGE LIGHTING.

Application filed February 24, 1925. Serial No. 11,108.

This invention relates to stage lighting and has for its object to provide a new method and means enabling the entire stage to be illuminated by the directed rays of light of a lamp or lamps arranged to project the dominant rays along the platform of the stage to the end that the platform is entirely illuminated and no dark spots or portions remain. We have succeeded in attaining this result in a simple and practical manner by arranging the row of incandescent lamps in the gutter of the stage floor in line with the floor surface and with the longitudinal axis of each lamp extending from the lamp base towards the stage floor at an acute inclination relative to the plane of the floor surface. We have found that this mounting of the lamps results in the direct projection of a pair of light rays upon the floor surface so that the latter will be uniformly illuminated while other light rays are diffused in an upward direction but at such an angle that harmful effect therefrom upon the eyes of the actors is greatly minimized, if not altogether obviated.

A further object is to provide means in combination with the directed rays of light to reflect the anterior rays and deflect them into the dominant rays to increase the lighting intensity thereof.

A further object is to co-relate white and colored lamps and direct the light rays thereof along the platform of the stage in such a manner that one lamp or group of lamps is not in the way of the other; a further object is to arrange reflecting means in respect to said series of lamps to focus the combined rays thereof in a given direction, and finally the object is to provide novel reflecting means of a continuous construction extending along the width of the platform and concentrating the rays, both white and colored in a given direction. A further object is to make the upwardly extending construction as low as possible to keep the height down to 1¾ inches above the stage.

Heretofore in the lighting of stages where two rows were used of colored and white light bulbs, the colored lights were higher than the white lights, and the bulbs were so arranged that the colored lights were impeded by the white lights in the direction of the light rays towards the stage, and the colored lights impeded the white lights in the direction of the reflector. Very unsatisfactory results were obtained and particularly dark spots were left on the stage platform. Moreover the positioning of the bulbs necessitated a reflector structure of a certain height, which impeded the view of the audience in the first rows of seats.

The use of our invention overcomes the defects mentioned, in that no dark spots are possible and moreover, the reflector structure may be lowered several inches which enables the front seats audience to see better, and at the same time permits a re-construction of theatre architecture in that the inclination of the seating floor may be disposed to take advantage to obtain better visual effects.

Our invention will be more fully described in respect to various embodiments, and shown in the drawings and finally pointed out in the claims.

In the accompanying drawings.

Similar characters of reference indicate corresponding parts throughout the various views.

Figure 1:
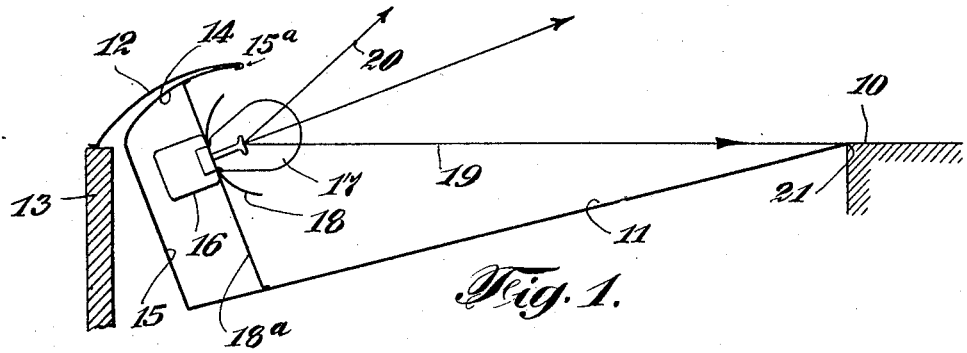
Figure 1 shows an embodiment of our invention in which the bulb is arranged in respect to the stage level so that one surface of the cone of the dominant rays is in line with the stage level.

Referring to the drawings and more particularly to Fig. 1, the level of the stage is indicated by 10, and in front of the stage, as is customary with stage lighting, a depressed gutter 11 is provided which has a hood 12 suitably supported on a board or the like, of the stage structure, said board being indicated by 13. Below the hood 12 a subsidiary hood 14 is provided, which is connected with the inner wall 15 of the gutter 11. Within the gutter 11 there are arranged suitable sockets 16 of well-known construction and suitably electrically connected with the circuit, which electrical connection forms no part of our invention and in these sockets are arranged bulbs 17, preferably of the type known as "P-19". Any suitable ring-filament type may be used. When larger watt bulbs are desired, the general inclined position of the bulbs remains the same, it being only necessary to extend the pocket position 15ª of the hood to accommodate the longer size of the bulbs, the depth or height of the hood not being increased thereby. Interposed between the bulb and the socket is a reflector of any suitable construction, indicated by 18. In this form the sockets are supported by a wall 18ª.

It will be noted particularly that the socket 16 and the bulb 17 is arranged in such a manner that the cone of dominant rays indicated generally by the bounding lines 19 and 20, is so disposed in relation to the level of the stage 10 that the cone is substantially tangential with the level of the stage. This is due to the positioning of the bulb 17 of the ring-filament type and by this the entire surface of the stage becomes illuminated, no part of the stage and particularly no part of the corner 21 thereof acting to impede the light rays, by which dark spots are usually produced on the stage. In other words, owing to the fact that we mount the several lamps in the gutter wall which is obliquely inclined relative to the plane of the floor surface and with the longitudinal axis of each lamp extending from the lamp base towards the stage floor at an acute inclination relative to said plane, a part of the light rays are directly projected upon the surface of the floor so that said floor surface will be uniformly illuminated. The other light rays are diffused upwardly and directed at such an angle that there is practically no glare from the lamps upon the eyes of the actors, thus obviating the harmful effects which have heretofore been experienced by stage performers.

Figure 2:
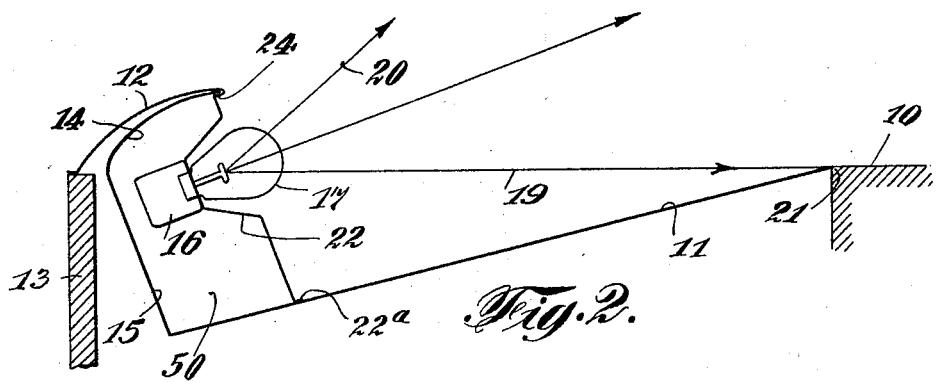
Fig. 2 is the same arrangement with the bulb provided with a special reflector.

In Fig. 2 another embodiment shows the general position of the parts as just described but provides the bulb 17 with a novel form of reflector, indicated by 22. This structure is such that the surface of the reflector is in substantial parallelism with the walls of the bulb and due to the inclination of the reflector walls, such light rays as are impinged by the reflector are deflected either directly into the cone of light 19—20 or indirectly by being first impinged upon the opposite wall of the reflector. In this case the improved reflector is suitably secured at 24 to the hood 12, and to the gutter wall as at 22ª. The bulbs seat directly against the reflector 22, with the base of the bulb entering into the socket, the reflector being interposed between the bulb and the socket, and the socket and reflector being secured together. The reflector forms the outside part of the wiring gutter indicated by 50.

Figure 3:
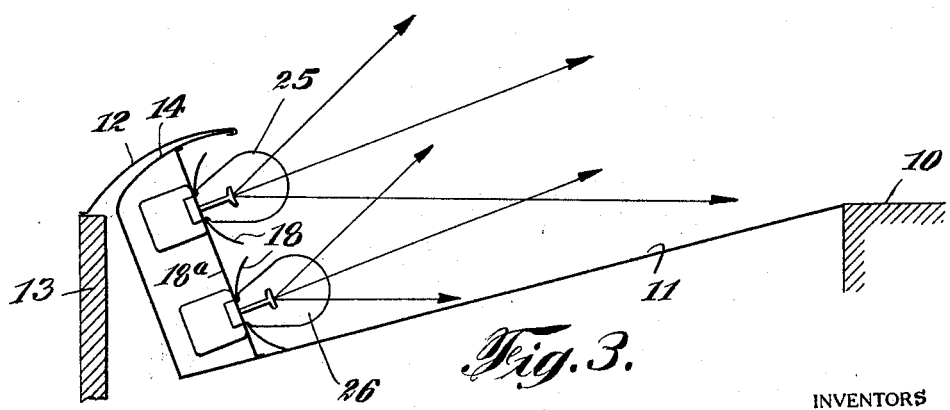
Fig. 3 is a similar arrangement with two sets of bulbs in which the white bulbs are so arranged that the dominant rays are directed along the stage level.

In the embodiment shown in Fig. 3 the general plan of Figs. 1 and 2 is followed but instead of one series of horizontally arranged bulbs, two series are provided. Contrary to the practice heretofore, the white light bulbs, indicated by 25, are arranged uppermost, and the colored light bulbs 26, are arranged lowermost. This arrangement of the bulbs gives the dominant flow of light as white directly along the level of the stage and the colored light rays are directed towards the light rays of the white bulbs, and thereby gives a mellowness to the white rays. In the embodiment shown in Fig. 3, ordinary reflectors 18 are provided, similar to the construction shown in Fig. 1. Again an auxiliary wall 18ª is provided for the wiring gutter, and for holding the sockets, and the reflector is separate.

Figure 4:
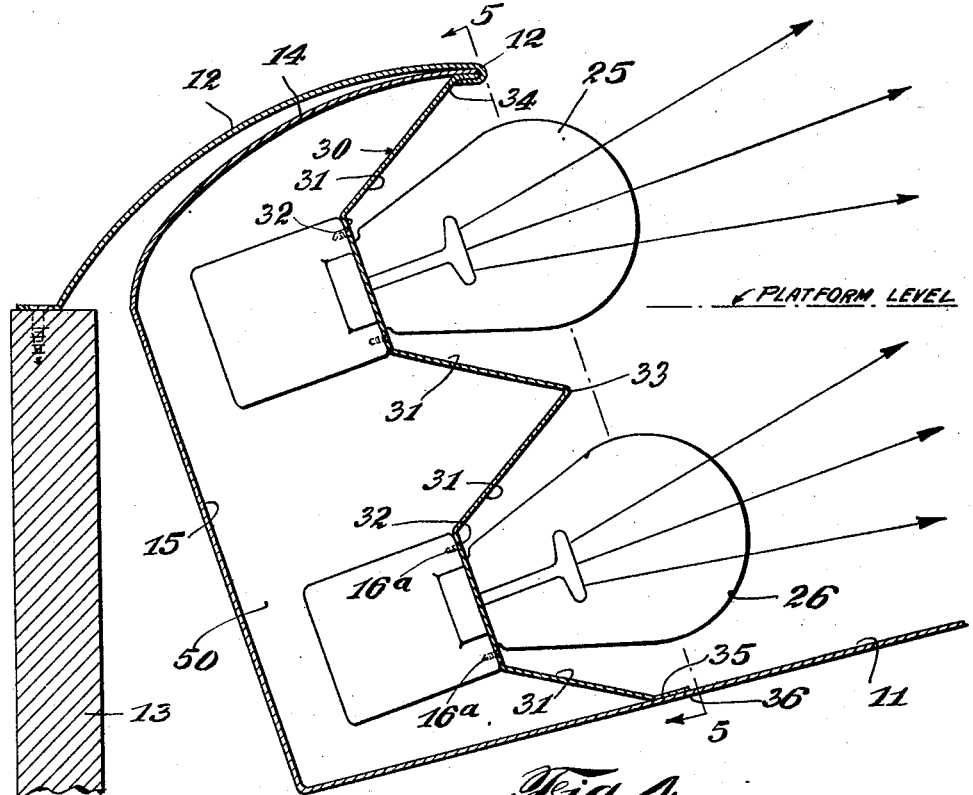
Fig. 4 shows two series of bulbs provided with a reflector focusing the rays in the direction of the stage, the embodiment here shown showing also a special form of reflector.
Figure 5:
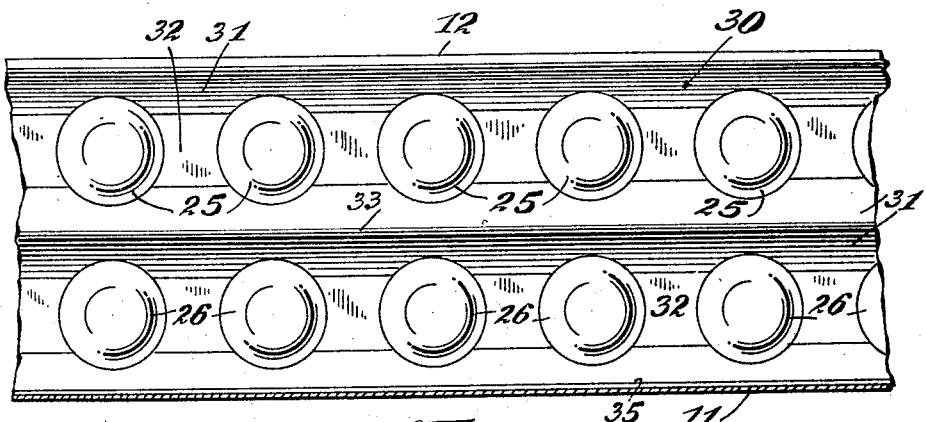
Fig. 5 is a sectional view taken on line 5—5 of Fig. 4.

The preferred embodiment of our invention is shown in Figs. 4 and 5 and herein the white light bulbs 25 are arranged again uppermost and the colored bulbs 26 lowermost. A special form of reflector is provided, which consists of a continuous piece of metal, indicated by 30, having an inclined portion extending along the light of the stage and surrounding at two opposite sides, the bulbs. The inclination of the walls 31 is such that they are substantially parallel with the walls of the bulb and at such an inclination that the rearward rays of the incandescent filaments are received by these reflecting walls and reflected towards and in the direction of the dominant rays of the bulbs. Intermediate these inclined walls 31 the base portions 32 are provided, through which the bases of the bulbs are readily passed. Preferably the reflector described consists of one piece of metal but it is clear that two structures may be readily joined, as at 33, without influencing the action of the reflector. The free end, as at 34, is suitably connected with the hood 12, and the other free end, as at 35, is also suitably connected to the wall 36 of the gutter 11. The reflector is again interposed between the bulbs and the sockets, and the reflector is secured to the sockets, and the reflector acts as a wall to segregate the wiring gutter.

In Fig. 5 we have shown the bulbs arranged longitudinally next to each other, preferably extending along the entire width of the stage, with the white lights superimposed upon the colored lights. Thus a continuous reflector extending along substantially the width of the stage is provided forming a footlight trough, and it acts to merge into each other the light rays, whereby the filaments are not visible.

Our invention has the advantage that the light rays are so directed that the largest portion thereof emanating from an incandescent bulb are directed along the level of the stage and thereby obviating the formation of dark spots thereon. By the arrangement of the bulbs as described, the hood 12 may be lowered several inches below the hoods as now used, whereby the advantage is obtained that the persons in the front rows are enabled to see the stage better and also the general seating arrangement of the audience may be improved, in that the inclination of the seating floor may be given a larger range of vision. Particularly, however, the arrangement of the white lights above the colored lights has the advantage of giving a good lighting effect mellowed by the colored lights, without having the lights themselves impeding each other as has been the case in the stage lightings heretofore in use. For the amount of light given, the wattage is considerably less, because every inch is utilized.

We have shown various embodiments of our invention but it is clear that changes may be made therein without departing from the spirit of the invention as defined in the following claims.

What is claimed as the invention and is desired to be secured by Letters Patent is:

1. In combination with the light gutter of a stage floor having a wall extending above and below the floor surface and positioned in an obliquely inclined plane with respect to said surface, and a row of incandescent lamps mounted in said gutter wall and projecting therefrom towards the stage floor and in line with the floor surface, and said gutter wall having angularly extending portions provided with reflecting surfaces above and below the lamp row.

2. In combination with the light gutter of a stage floor having an obliquely inclined wall extending above and below the plane of the floor surface, a plurality of lamp receiving sockets fixed to one side of said wall, and incandescent lamps engaged in said sockets and projecting from the opposite side of the gutter wall towards the stage floor and in line with the surface thereof.

3. In combination with the light gutter of a stage floor having a wall closing one side thereof, a plurality of lamp receiving sockets fixed to one side of said wall, indcandescent lamps engaged in said sockets and projecting towards the stage floor in line with the surface thereof, and said gutter wall having angular portions provided with reflecting surfaces disposed above and below the row of lamps.

4. In combination with the light gutter of a stage floor having a wall closing one side thereof obliquely inclined with respect to the plane of the floor surface, upper and lower rows of incandescent lamps mounted in said gutter walls and differently colored with respect to each other, the lamps in each row projecting from said wall towards the floor surface and the lamps in one row having their longitudinal axis intersecting the plane of said floor surface at an acute inclination, and said gutter wall having parts provided with reflecting surfaces for the light rays emanating from each row of lamps.

5. In combination with a light gutter of a stage floor, a row of uncolored incandescent lamps mounted in said gutter and projecting towards the stage floor at an acuate angle to project their rays on the stage floor, and a second row of colored lamps arranged at the same angle as the first row of lamps and adapted to project their light rays above the stage floor, and reflecting means for each row of lamps.

In testimony that we claim the foregoing as our invention, we have signed our names hereto.

ANTON NEWBURGER.
EDWARD SCHULTZ.